106-90

Patented July 27, 1954

2,684,720

UNITED STATES PATENT OFFICE 2,684,720

PROCESS OF DRILLING WELLS USING LOW-WATER-LOSS CEMENT SLURRY

Peggy J. Lea, Merriam, Kans., assignor to Phillips Petroleum Company, a corporation of Delaware No Drawing. Original application August 29, 1949, Serial No. 113,031, now Patent No. 2,646,360, dated July 21, 1953. Divided and this application January 2, 1953, Serial No. 329,433

6 Claims. (Cl. 166—31)

1

This invention relates to low-water-loss cement slurries. In one aspect, it relates to low-water-loss cement slurries comprising a hydraulic cement, sufficient water to form a slurry, and an effective amount of a water-loss reducer comprising an alkali lignin sulfonate and an alkali metal salt of an inorganic acid. In another aspect, it relates to low-water-loss cements of the type described, containing a non-cement, inert, granular aggregate material. In still another aspect, it relates to a low-water-loss cement slurry containing an effective amount of a set-retarder, such as calcium sulfate and/or calcium chloride.

The present application is a division of my copending application Serial No. 113,031, filed August 29, 1949, now Patent No. 2,646,360, for "Low Water-Loss Cement Slurry."

In the art of cementing oil wells and in grouting cracks in masonry structures there is a tendency for the cement slurry to lose water to such an extent that it becomes dehydrated, set, or cracked prematurely. The result is that it cannot be properly placed in position because of an increase in viscosity of the slurry, and resulting increase in the force necessary to pump or move the slurry into position. This undesirable dehydration is increased in many oil wells by the modern practice of scratching, or scraping the drilling mud from the wall of the well by mechanical means prior to placing the cement, which often exposes porous formations which will absorb the water from the slurry. This is particularly important when oil sands are penetrated. Artificial contamination of oil sands with water will often cause shaley impurities in the sand to swell and reduce the permeability of said oil sand to a very great extent. Therefore water lost from the slurry tends to seal off the formation to oil flow. When it is intended to cement with slurry, and then gun perforate the hardened cement, the gun perforator may not be able to penetrate into the region beyond that in which the shaley impurities are swollen by the water extracted from the slurry. In such cases the oil production rate of the well may be severely reduced by water contamination from the slurry.

I have discovered a method for preventing the filtration of water from cement slurries to the absorbent surrounding formations and the resulting contamination of such formations. I do this by adding to the cement slurry a small amount of an alkali lignin sulfonate and a small amount of an alkali metal salt of an inorganic acid, or an ionizable alkali metal compound.

2

One object of the present invention is to provide an improved low-water-loss cement slurry useful for grouting in general, for cementing the walls of wells, and for cementing pipe in wells.

Another object is to provide a low-water-loss cement which will not contaminate the earth formations in bore holes with water to any substantial degree.

Another object is to provide a cement slurry suitable for use in oil well cementing operations.

Another object is to provide a low-water-loss cement.

Numerous other objects and advantages will be apparent upon reading the accompanying specification and claims.

In preparing the low-water-loss cement slurry, the dry ingredients, comprising hydraulic cement, with or without additives for increasing the time of set, the inert filler material, such as sand or crushed limestone, and the alkali lignin sulfonate and alkali metal salt may be mixed together and later mixed with water alternatively. The water-loss reducers may be mixed separately with hot or cold water, and then added to the cement to form the slurry. The mixing of the hydraulic cement with water must, of course, be done promptly before placing the slurry in position.

By hydraulic cement we intend to include all mixtures of lime, silica, and alumina, or of lime and magnesia, silica, and alumina and iron oxide (magnesia, for example, may replace part of the lime, and iron oxide a part of the alumina) as are commonly known as hydraulic cements. Hydraulic cements include hydraulic limes, grappier cements, puzzolan cements, natural cements, and Portland cements. Puzzolan cements include slag cements made from slaked lime and granulated blast furnace slag. Because of its superior strength, Portland cement is preferred among the hydraulic cement. In the art, hydraulic cements are recognized as a definite class, and as results of value may be obtained with any member of that class, it is intended to claim all hydraulic cements. See section 37, page 59, entitled "Hydraulic cementing materials in general—introductory" from "Materials of Construction," by Adleburg P. Mills (1915), John Wiley and Sons, New York.

In most oil well cementing and grouting operations it is generally desirable to use neat cement for added strength, but, obviously, it is always possible to add a certain amount of an inert granular filling material or aggregate such as sand, ground limestone, or any of the other well-known inert aggregates, as long as the amount added does not reduce the strength of the cement below the desired value. In operations in open wells it is often desirable to use neat cement, because inert filling material will automatically become detached from the walls of the well, and will tend to mix with and dilute the slurry to such an extent that it is undesirable to add any filling material to the slurry being forced into the well.

I have found that the addition of a minor amount of an alkali metal, alkaline earth metal, magnesium or ammonium lignin sulfonate and an alkali metal salt of an inorganic acid to the cement slurry reduces the rate of water-loss from the cement slurry to any water-absorbent medium with which the slurry is in contact. These lignin sulfonates therefore consist of the alkali metal, the alkaline earth metal, magnesium, and ammonium salts of lignin sulfonic acids. The sodium, potassium, lithium, calcium, strontium, barium, magnesium, and ammonium salts are most effective. For economy reasons, the sodium, calcium, and magnesium salts are preferred. Of the alkali metal salts or other compounds which may be added along with the lignin salts, I prefer to use sodium carbonate, sodium hydroxide, sodium sulfate, or sodium oxalate, in the order named.

The structure of lignin is not definitely known. The authorities generally believe that it is a polymer of propyl guaiacol. The lignin molecule is believed to contain at least 1 phenolic hydroxyl group and probably 4 other hydroxyl groups, 3 of which are apparently of equal reactivity and are probably primary alcohol groups. The other, somewhat less reactive group, is probably a secondary alcohol.

Lignin sulfonates are obtained as by-products of the sulfite process for the production of wood pulp. They comprise a considerable proportion of the original wood and are obtained from the cooking solutions as calcium, sodium, or mixtures of calcium and magnesium salts of ligno-sulfonic acids, depending on the coagulant used.

In the pulping process, it is believed that sulfurous acid is added to an enolic double bond in the lignin molecule. It is believed that ligno-sulfonic acid is stronger than sulfurous acid and reacts with bisulfite to form the metal ligno-sulfonate. Emil Ott, in "High Polymers, volume V, Cellulose and Cellulose Derivatives," Interscience Publishers, Inc., New York (1946), on page 487 represents these reactions in Formulas 1 and 2:

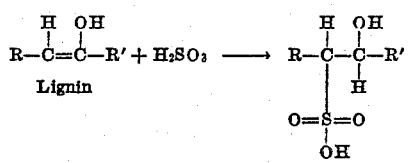

Lignin → Lignosulfonic acid

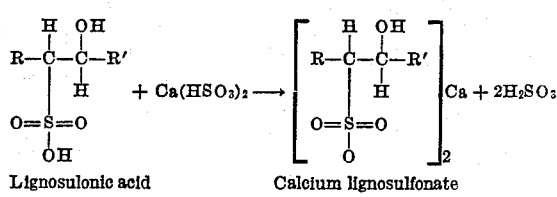

Lignosulonic acid → Calcium lignosulfonate

Calcium lignin sulfonate, sodium lignin sulfonate, mixed calcium and magnesium lignin sulfonates and basic calcium lignin sulfonates are commercially available from a number of chemical or paper manufacturing companies.

My method is effective in reducing the water loss from any hydraulic cement such as Portland cement or Starcor, which is a hydraulic cement having a retarded set. Starcor differs from Portland cement in that it contains $2CaO.Fe_2O_3$ instead of $3CaO.Al_2O_3$, and has a high ratio of di-calcium silicate to tri-calcium silicate, whereas Portland cement has a high ratio of tri-calcium silicate to the di-calcium silicate.

My water-loss reducing agents may be mixed with the cement before the addition of water, they may be added to the slurry at the time of mixing, or they may even be added to the water before the mixing of the cement slurry.

Tests were carried out with both Portland cement and Starcor retarded set cement to determine the effectiveness of my method for reducing the water loss. It will be noted that in some cases, the water loss for a very short period is shown. In those cases where the water loss was complete in less than the usual 30 minute test period, the time for complete water loss is shown along with the amount of filtrate.

In each of the following examples the amount of additive is expressed as the weight per cent based on the amount of dry cement. In each sample, the amount of water is 40% based on the dry cement. This gave a slurry having an approximate density of 15 pounds per gallon. The samples were prepared by adding the required amount of additive and water to a weighed portion of cement. The mixtures were stirred with a spatula for about 30 seconds and then were stirred for about 3 minutes on a laboratory mixer. The following table presents the results of these tests:

| Cement | Additive | Conc. of additive, as per-cent of cement | Water loss, ml./min., at 100 p.s.i. |
|---|---|---|---|
| Portland | None | 0 | 105/1.3 |
| Do | Sodium lignin sulfonate | 1 | 11/30 |
| Do | Sodium lignin sulfonate + NaOH | 1 / 0.2 | 5.4/30 |
| Do | Calcium lignin sulfonate | 1 | 20/0.2 |
| Do | Calcium lignin sulfonate + NaOH | 1 / 0.2 | 7.3/30 |
| Do | Calcium lignin sulfonate + $Na_2SO_4$ | 1 / 0.2 | 12/30 |
| Do | Calcium lignin sulfonate + $Na_2C_2O_4$ | 1 / 0.2 | 11/30 |
| Do | Calcium lignin sulfonate + $Na_2CO_3$ | 1 / 0.2 | 8/30 |
| Do | Calcium lignin sulfonate + NaCl | 1 / 0.2 | 37/24 |
| Starcor | None | 0 | 65/0.2 |
| Do | Calcium lignin sulfonate | 1 | 33/2.1 |
| Do | Calcium lignin sulfonate + $Na_2CO_3$ | 1 / 0.2 | 11.5/30 |

A portion of each sample was allowed to set to determine the suitability for use in well-cementing and grouting. The treated samples set into hard cement having acceptable physical properties. The blank samples, which had high water losses, set in a cracked and weakened condition. This was, no doubt, the result of incomplete hydration of the cement due to a lack of sufficient water during the setting.

The use of inert filling material in my low-water-loss cement may be practiced within the scope of my invention.

The foregoing tests have been given for the purpose of illustrating and explaining my invention and it is not intended to limit my invention to the use of the specific mixtures or compositions used in the tests. My invention is defined by the following claims.

Having described my invention, I claim:

1. The process of cementing a well which extends into a porous formation, comprising forming a hydraulic cement aqueous slurry having a reduced water-loss, by admixing a hydraulic cement with from 0.1 to 3 per cent of its dry weight of a salt of lignin sulphonic acid separated by chemical treatment from other constituents present in waste sulphite liquor and selected from the group consisting of alkali metal, alkaline earth metal, magnesium and ammonium lignin sulfonates, with sufficient water to produce a resulting fluid slurry, and from 0.05 to 3 per cent by weight of the dry cement of an ionizable alkali metal compound selected from the group consisting of alkali metal salts of inorganic acids and alkali metal hydroxides, said slurry being free from sugar and sugar sulfonic acid and salts thereof and any other constituents present in said waste sulphite liquor other than said salts of lignin sulphonic acid, and introducing said resulting fluid slurry into said well into contact with said porous formation.

2. The process of claim 1 in which the salt of lignin sulfonic acid is sodium lignin sulfonate and the ionizable alkali metal compound is sodium carbonate.

3. The process of claim 1 in which the salt of lignin sulfonic acid is magnesium lignin sulfonate and the ionizable alkali metal compound is sodium carbonate.

4. The process of claim 1 in which the salt of lignin sulfonic acid is calcium lignin sulfonate and the ionizable alkali metal compound is sodium carbonate.

5. The process of claim 1 in which the salt of lignin sulfonic acid is sodium lignin sulfonate and the ionizable alkali metal compound is sodium hydroxide.

6. The process of claim 1 in which the salt of lignin sulfonic acid is calcium lignin sulfonate and the ionizable alkali metal compound is sodium hydroxide.

References Cited in the file of this patent

UNITED STATES PATENTS

| Number | Name | Date |
|---|---|---|
| 2,081,642 | Scripture | May 25, 1937 |
| 2,141,570 | Mark | Dec. 27, 1938 |
| 2,469,353 | Alcorn et al. | May 10, 1949 |